FIG. I

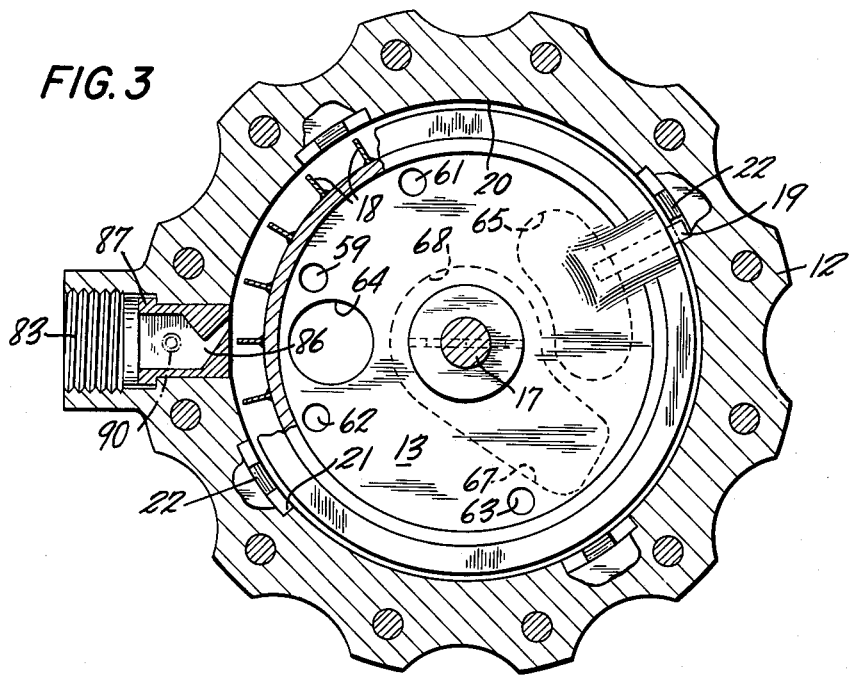
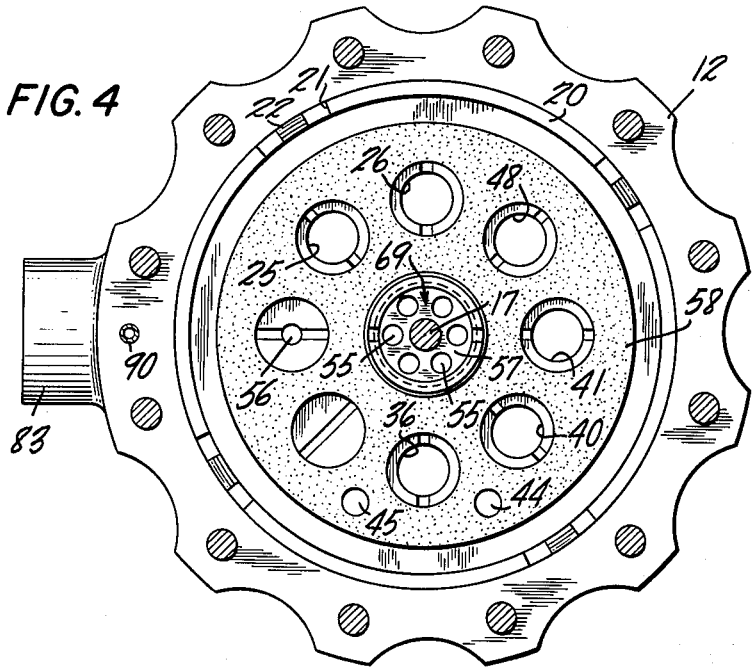

June 21, 1966

L. OBIDNIAK ETAL 3,256,909

HYDRODYNAMIC MULTIPORT VALVE

Filed June 17, 1963

3,256,909
HYDRODYNAMIC MULTIPORT VALVE
Louis Obidniak, Duvernay, Montreal, Quebec, and Sydney Sheinberg, Montreal, Quebec, Canada, assignors to Pall Corporation, Glen Cove, N.Y., a corporation of New York
Filed June 17, 1963, Ser. No. 289,458
5 Claims. (Cl. 137—625.31)

This application is a continuation-in-part of application Serial No. 206,868, filed July 2, 1962, now abandoned.

This invention relates to multiport valves and particularly to multiport valves of the diaphragm type in which the rotary port plate is equipped with turbine blades for turning the plate and an indexing means for positioning the plate in the various sequential positions of the valve.

Multiport valves are available having a rotor operated by fluid pressure, through the joint action of a diaphragm and cam arrangement. A multiple port valve of this type is described in U.S. Patent No. 2,833,309, Canadian Patent No. 578,545 to Bird. Such valves have the disadvantage that a relatively high fluid pressure is required to operate the rotor, due to the force needed to actuate the cam arrangement, and this means that a system incorporating such a valve must be equipped with a pump capable of supplying water at the necessary quantity and pressure. This can create problems in the operation of water treatment systems, for example, in the country and in private homes, since the large size pump and the amount of water require large capacity wells, and also considerably add to the cost of installation and operation.

In accordance with the invention, a multiport valve is provided in which the rotary port plate is equipped with means such as turbine blades operated by fluid flow for turning the plate, and with means for positioning the plate in the sequential positions of the valve. The multiport valve of the invention accordingly comprises, in combination, a body having a ported face, and a multiplicity of flow passages communicating with the port in said face; means defining a fluid supply chamber at one side of the ported face; a rotary port place in the supply chamber mounted in confronting relation with the ported face and to be turned to different rotative settings in relation with said ported face; said plate having ports therein, arranged to register with different ports in the ported face, to pass fluid from the supply chamber through the ported face in successive rotative settings of the plate; means operatively connected to the plate for releasably retaining the plate in successive settings, and exposed on one side to the fluid presure in said fluid supply chamber; a plurality of turbine means operatively connected to the plate for turning the latter between successive positions upon release of said plate retaining means; positioning means associated with the plate to arrest the plate at a preselected successive position; and a fluid inlet for passing fluid into said fluid supply chamber, and directing fluid flow against the turbine means to rotate the plate in the direction of fluid flow.

The preferred embodiment of the invention also comprises movable pressure-responsive means operatively connected to the plate for releasing the plate, so as to permit it to turn to a successive rotative setting, and exposed on one side to the fluid pressure in said fluid supply chamber; means associated with said inlet for directing fluid flow against the turbine means to rotate the plate in the direction of fluid flow; means defining a pressure chamber at the opposite side of the movable pressure-responsive means, and communicating with said fluid inlet for receiving fluid therefrom to establish fluid pressure at said opposite side of the pressure-responsive means equalling the fluid pressure at the inlet, to effect movement of the pressure-responsive means and retain the plate after rotation to a successive position; and means for selectively emptying fluid from the pressure chamber to lower the pressure at said opposite side of the pressure-responsive means below the pressure at said one side thereof, to effect movement of the pressure-responsive means for releasing the plate for rotation thereof to a successive position.

The accompanying drawings illustrate preferred embodiments of four-position multiport valves of the invention, especially designed for use with a water-treatment system. In the drawings, for purposes of illustration, the valve parts are shown in the "fast-rinse" position.

FIGURE 3 is a top view of the valve, with the cover and diaphragm removed, showing the rotary port plate;

FIGURE 4 is a section through the body of the valve, taken along the line 4—4 in FIGURE 1, with rotary port plate removed, to show the ported face of the valve body;

Figure 1:
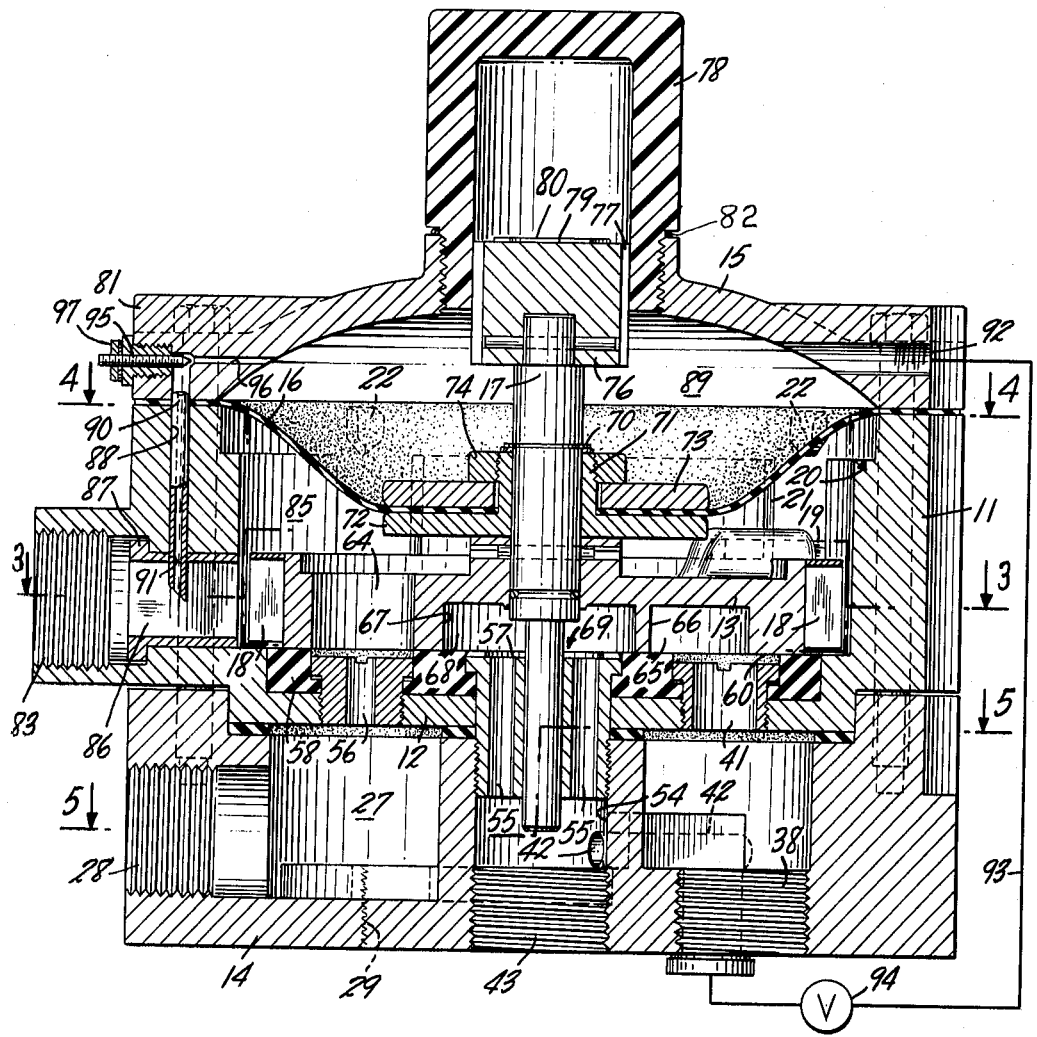
FIGURE 1 is a longitudinal section through the center of one embodiment of multiport valve of the invention, taken through the inlet line, best shown in FIGURE 3.
Figure 2:
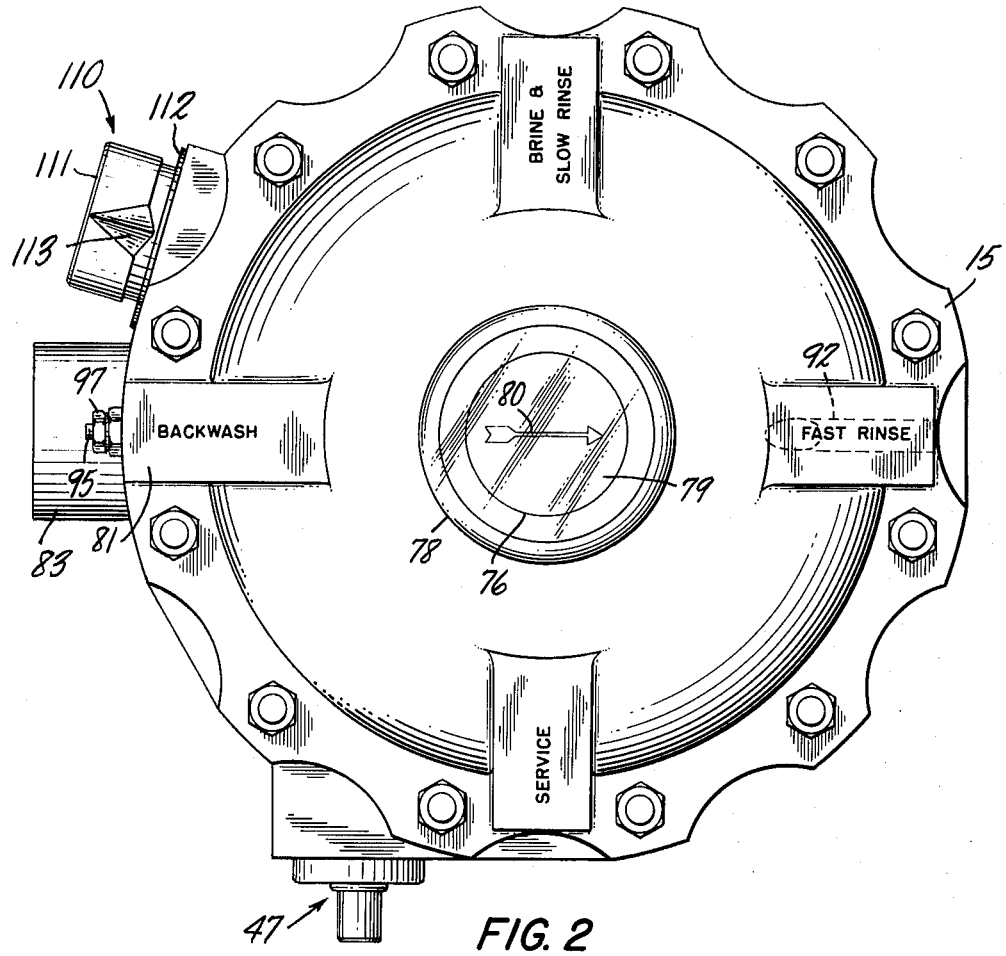
FIGURE 2 is a top view of the valve.

The multiport valve of the invention includes a body 11 having a ported inner face 12, and extending around a rotary port plate 13, overlying the ported face. The body 11 thus constitutes a housing for the plate. Below the body 11 and attached thereto is a manifold 14. A cover 15 is attached to the body 11. A resilient flexible diaphragm 16 is clamped at its periphery between the body 11 and the cover 15. A valve stem 17 is connected to the rotary port plate 13, and a plurality of turbine vanes or blades 18 are carried on the periphery of the plate for rotating the plate between successive rotative positions when unseated from the ported face. At the top edge of the plate is a key 19 sliding along a track 20. The track carries a plurality of recesses 21, adapted to receive the key 19 and position the plate at the selected successive positions of the valve. A plurality of stops 22 are provided, one placed above each recess, in a position at the level of track surface, in the path of the key, to encounter the key in its movement along the track.

The stops and slots as shown are so dimensioned as to permit the key 19 to enter each successive slot. A plurality of keys 19, each of different shape and/or dimension, can be provided, with counterpart stops and slots for each type of key, so as to permit entry of a key only into predetermined slots. In this way, the plate can be made to skip slots, and fall into any predetermined sequence of slots, regardless of their positions on the track.

The body 11 at its ported face has a plurality of ports communicating, respectively, with passages in the manifold 14. The ports 25 and 26 in the ported face of the body communicate with a chamber 27 in the body which communicates through an opening 28 in the periphery of the body with a conduit (not shown) leading to the top of a liquid storage reservoir, such as a water treatment tank. The treatment tank can be of the type of softening water, but it might also be a water demineralizer or a water filter or sterilizer.

Figure 7:
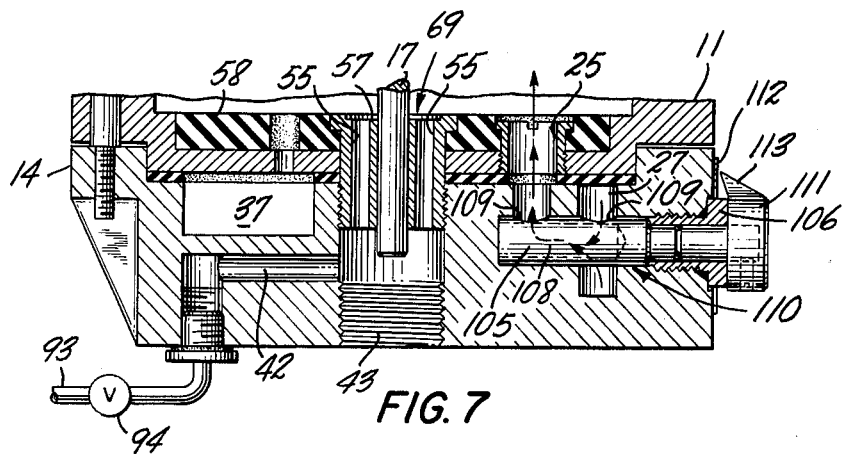
FIGURE 7 is a detailed section through an embodiment of flow regulating valve in the line communicating with the top of a water treating tank.
Figure 5:
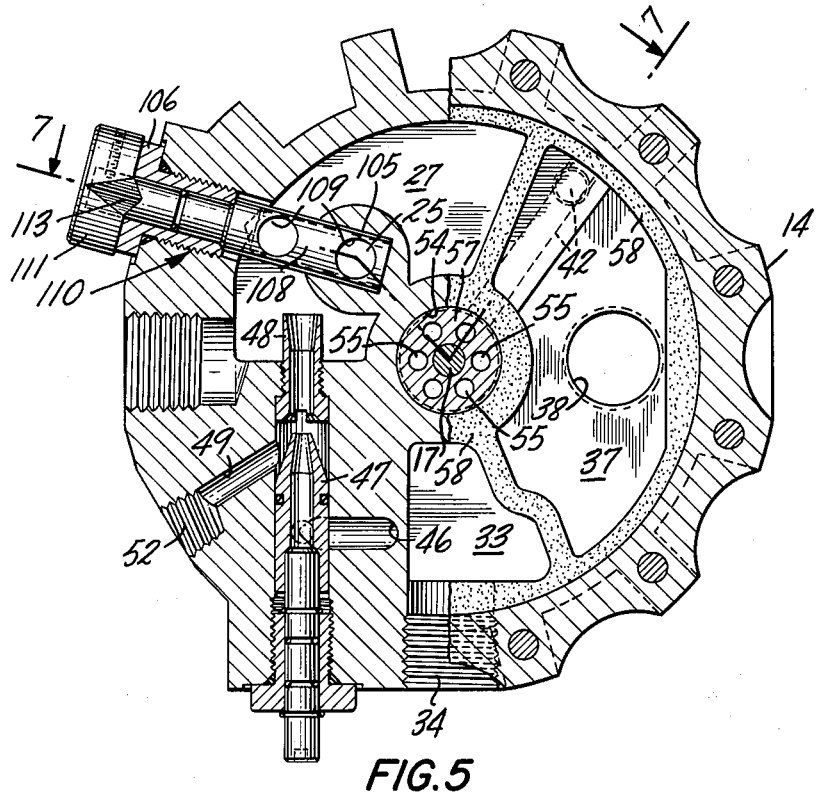
FIGURE 5 is a section through the body of the valve, taken along the line 5—5 in FIGURE 1, to show the manifold of the valve.

A throttling valve assembly 110, best seen in FIGURE 7, is disposed in chamber 27, to control backwash flow through opening 28. A flow regulating valve assembly of any suitable design can be used for this purpose. The valve assembly shown has certain special features.

The throttling valve assembly 110 includes a tubular stopcock 105, rotatably received in a bushing 106 threadedly held in the manifold 14. Stopcock 105 is positioned in the bore in such a manner that passage 108 of the member at spaced arcuate positions communicates port 25 with chamber 27. The proportion of the passage openings 109 that no exposed for flow to chamber 27 is controlled by the rotational position of the stopcock 105. In this way, the flow through passage 108 of the valve is limited as desired. The position of stopcock 105 is determined by rotation thereof, using the knob 111, to which is attached a pointer 113 from which the position of member 105 can be read directly on a scale 112. The scale is so calibrated against the position of the valve that the flow volume can be read directly from the scale.

Another chamber 33 in the body 11 communicates through a passage 34 in the periphery of the body with a conduit (not shown) leading to service. A port 36 in the ported inner face of the body communicates with this body chamber 33.

Another chamber 37 in the body 11 communicates through an opening 38 in the periphery of the body with a conduit (not shown) extending from the bottom of the treatment tank below the bed of treatment material therein. Ports 40, 41 and 48 in the ported inner face of the body communicate with this chamber 37.

At one end of the body chamber 37 there is a passage 42 extending between a drain passage 43 located at the center of the body and a pipe connection (not shown) extending through the lower outer wall of the body.

The body 11 is also provided at its ported inner face with a port 45 communicating with a passage 46 leading to the inlet end of an adjustable ejector nozzle 47 mounted within the body. The nozzle 47 discharges into a venturi-shaped throat member 48 also mounted in the body, the outlet end of the throat communicating with the chamber 27 in the body. Between the discharge end of the ejector nozzle 47 and the inlet end of the throat 48 there is a passage 49 in the body 11. A pipe leading from a brine tank communicates with this passage through an opening 52 in the bottom of the body. Thus, water discharged through the ejector nozzle 47 into the throat 48 is adapted to draw brine into the passage 49 in the body and thence through the throat 48 of the ejector into the chamber 27 in the body leading to the top of the treatment tank.

At the center of its ported inner face the body 11 is formed with an opening 54 leading down into the drain passage 43. At its other end this drain passage is connected to a drain pipe (not shown). A ferrule 57 having six passages 55 therethrough communicating with the drain passage 43 is threadedly received in the central drain opening 54 in the body, and serves to clamp a resilient valve seat or gasket 58 of rubber or the like overlying the ported inner face of the body as well as providing rapid drainage of fluid from lower pressure chamber 85 to drain passage 43 in both the raised and lowered positions of the plate 13. The gasket 58 is formed with holes therethrough which register with the above-described ports in the ported inner face of the body.

The rotary port plate 13 includes a plate portion 60 having a flat underface adapted to seat on the gasket 58 overlying the ported inner face of the body 11. A port 59 extending through the plate is positioned to register, for example, with the port 45 in the ported inner face of the body in preselected different rotative settings of the plate. Three ports 61, 62 and 63 which extend through the plate are positioned respectively to register with the ports 44 and 45 in the ported inner face of the body in different preselected rotative positions of the plate. Another port 64 which extends through the plate is positioned to register with the ports 26, 36, 41 and 56 in the ported face of the body in certain of the rotative positions of the plate. The plate is also formed with an elongated passage 65 in its underface which is disposed below a downwardly facing channel shaped plate portion 66. In one of the rotative settings of the plate, the passage 65 registers with the ports 36 and 40 in the ported face of the body. A downwardly facing channel portion 67 of the plate overlies an elongated passage 68 extending radially in the underside of the plate. This passage 68 at its inner end communicates with a central port 69 at the underside of the plate which overlies the central drain passage 54 in the body 11 and hence passages 55 of ferrule 57 in all of the rotative settings of the plate.

The central port 69 of the plate receives snugly the lower end of the valve stem 17, to which it is fixed by retaining ring 70 and nut 74. The diaphragm 16 is clamped at its periphery between the body 11 and cover 15, and is formed with a central hole through which extends upwardly the tubular neck 71 of the lower diaphragm plate 72. The upper diaphragm plate 73 is slipped over the upper end of the lower diaphragm plate 72, and the diaphragm plates are clamped tightly together by the nut 74 against the diaphragm. The valve stem 17 extends through the passage in the tubular neck portion in the lower diaphragm, and is free to turn within this passage.

The upper end of the valve stem 17 supports a guide 76 having at its upper part a bearing face 77, which extends into the bushing 78 which closes off the cover 15, and in which the guide 76 rotates. The bushing 78 is preferably transparent, so that the top 79 of the guide 76 can be seen therethrough, and desirably the top 79 carries an indicator, such as an arrow 80, to indicate the position of the plate 13 at all times. Desirably, the cover 15 is provided with a plurality of bosses 81 corresponding in number to recesses 21 which can support descriptive indications for each plate position. The guide 76 is free to rise and fall and to rotate within bushing 78, with corresponding movement of the stem 17 and plate 13. The bushing 78 is preferably threaded into the cover 15, and is gasketed against leakage by O-ring 82.

At one side of the body 11 is an inlet passage 83 for passing fluid into the supply chamber 85 defined by the gasket 58, diaphragm 16 and the body 11. A flow restriction 86 is provided in inlet 83 for directing flow against the blades 18 to rotate the plate 13. The flow restriction preferably is provided in the form of a flanged square bushing 87 which is pressed in the end of passage 83, so that it can be replaced by any size bushing as required to meet the flow demand. A flow passage 88 in the body 11 and cover 15 connects the inlet 83 with the pressure chamber 89 above the diaphragm 16, and is positioned directly above the bushing 87. The passage 88 is provided with a tube 90, which extends through a hole 91 at the top of the bushing, locking it in position, into the flow restriction 86, and is provided with a lower face angled to scoop fluids entering the valve through restriction 86 into the tube.

Any desired flow can be provided in tube 90 by adjustment of the amount of opening of bleeder valve 95 inserted in the passage 96 at the top of tube 90, and leading into pressure chamber 89. Valve 95 is adjusted by removing self-sealing nut 97, and rotating the valve to the desired position. In this way, the rate of flow of fluid into the pressure chamber is controlled to give the desired speed of seating of the plate 13 after each successive rotation thereof.

Figure 6:
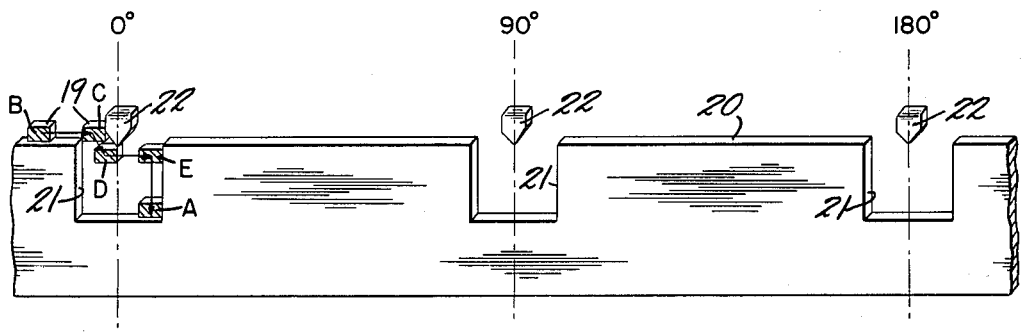
FIGURE 6 is a developed 180° portion of the circular guiding track for positioning the rotary port plate.

The plate 13 carries on its top a key 19 which travels on the track 20. When the plate 13 is seated, the key 19 is in its lowermost position A (FIGURE 6), in one of the recesses 21. When the plate 13 is lifted away from its seated position by movement of the diaphragm 16, the key 19 rises, and emerges from the recess, whereupon the plate 13 becomes free to move in a clockwise direction (or a counterclockwise direction, if the positions of the turbine vanes and the opening or inlet passage of the chamber below the diaphragm are reversed). As the plate rotates, the key 19 travels above the track as in position B, until it encounters stop 22 above the next recess (position C), where it remains until the diaphragm starts its downward movement to reseat the plate. In the first portions of the downward movement, the key is brought below stop 22, to position D, whereupon the key crosses the recess below the stop 22, and then encounters the side wall of the recess at position E, where it can move no further, except up or down. This halts the plate at that position, and when the diaphragm is lowered further, the plate is seated at that position. This cycle is repeated whenever the plate again becomes unseated, and moves thus to the next position. It will be seen from FIGURE 6 that one complete reciprocation of the valve stem and plate in this case causes the plate to turn 90°, or one quarter turn, but this can be adjusted as required.

Upper chamber 89 is connected via passage 92 in cover 15 and an outside conduit 93 and pilot valve 94 to the drain 43 via passage 42 in the manifold. The passage 92 in the cover communicates with drain 43 in all positions of the valve. When the pilot valve 94 is opened, either manually or automatically, the fluid pressure in the pressure chamber 89 above the diaphragm 16 is relieved through the passage 92, conduit 93 and internal passage 42 in the manifold leading to the drain 43. This causes the diaphragm to rise, unseating the plate 13, and in so rising the turbine key 19 is lifted from the recess, whereupon the plate turns, due to the hydrodynamic force of the fluid against the blades. When the valve 94 is closed, the pressure in the upper chamber 89 quickly rises above that in the lower chamber 85, because all ports in the plate are now exposed, as a result of the unseating of the plate, and the fluid in the lower chamber 85 can escape through the passages 55 in ferrule 57 at a higher rate than can enter the chamber through flow restriction 86, while chamber 89 continues to be connected to the pressure side of the inlet 88. The flow of fluid through the valve 95 controls application of pressure to the upper face of the diaphragm 16, and as a result, the diaphragm 16 is lowered under the greater pressure in chamber 89, at a rate controlled by the rate of flow of fluid through valve 95, and the plate is reseated. This pressure differential is continued, to keep the plate seated on the gasket, while the fluid flow through the valve continues. When flow is stopped, the plate is still kept seated due to the pressure differential between the chamber 85 and the atmosphere, via drain 43.

In operation of the multiport valve of FIGURES 1 to 7, inclusive, during the service run, the plate 13 and gasket 58 are in confronting relation with the ported face of the body 11. At this time the plate is in the rotative setting in which the plate is 270°, counterclockwise, from the position shown in the drawings and the port 64 registers with the body port 26, and the channel 65 connects the body ports 36 and 40. Untreated water flows through the inlet 83 into the supply chamber 85 and through the port 64 down through the body port 26 into the chamber 27 in the manifold, and thence to the top of the treatment tank through the port 28. After flowing down through the tank, the water flows through a conduit to the inlet 38 into chamber 37 in the manifold, and from there up through body port 40, plate port 65 and body port 36 into the chamber 33 of the manifold and from there through opening 34 to a conduit to service.

When the material in the treatment tank requires regeneration, the regeneration is initiated by opening valve 94 to drain the water from chamber 89 above the diaphragm 16. The fluid pressure from below, unbalanced by loss of water from above the diaphragm, causes the diaphragm to move upwardly, and by its connection to stem 17, the plate 13 is lifted upwardly away from the ported inner face of the body. As the plate and stem move upwardly, they are turned 90° by the described turbine arrangement. After the valve stem and plate have been turned 90°, the key 19 strikes the stop above the next recess in the track 20, and the plate stops rotating. The valve 94 is closed, lowering the diaphragm 16 and the plate, and reseating the plate at the next port position of the valve. Since a this time, with plate 13 unseated, there is a continuous water flow from inlet passage 83 through the supply chamber 85 and the passages 55 of ferrule 57 to the drain passage 43 in the manifold, the flow restriction 86 causes a pressure drop in chamber 85. Pressure in chamber 85 is thus at a valve predetermined by the flow restriction 86 below that of the pressure in the pressure chamber 89. This unbalance below the diaphragm 16 moves the diaphragm downwardly, to return the plate to seated position. Thus, in the event that the plate should be unseated unintentionally, while fluid flow continues, the reduced flow through the chamber 85 causes a pressure differential on opposite sides of the diaphragm to reseat the diaphragm. When the plate reseats on the gasket 58, it has been displaced one quarter turn, from its service position to the backwash position.

In this position of the plate, the port 64 registers with port 41 in the ported inner face of the body, port 61 registers with the body port 44 and the port 68 connects port 25 with port 69. Untreated water from the inlet passage flows through the supply chamber 85 and thence through the port 64 and body port 41 into the manifold chamber 37 and through a conduit to the bottom of the treatment tank. After backwashing vigorously through the treatment tank, the effluent flows from the top of the tank through a conduit to the manifold chamber 27 and the throttling valve assembly 110, and thence through port 25 into the passage 68 to the central port 69, of the plate 13, and thence through passages 55 of ferrule 57 to the drain passage 43 in the manifold. The throttling valve assembly 110 controls the flow rate through the treatment tank during backwash. Also, at port 61 a portion of the untreated water supply is bypassed through body port 44 and body chamber 33 to service.

Following the backwash step, the rotor is again unseated, as described before, and is turned successively through additional quarter turns to successively establish the "brining and slow rinse," and the "fast rinse" steps, in the regeneration cycle for the treatment tank.

In the "brining and slow rinse" position of the plate, the port 59 registers with the port 45 in the ported inner face of the body, the passage 68 registers with the body port 48, and the port 64 registers with the body port 36. At this time, raw water from the inlet passes through the supply chamber 85 and down through the ports 64 and 36 to the service line. The other part of the raw water flows through the port 59 and the body port 45, into the injector nozzle 47 and the throat 46, drawing brine from brine tank into the body chamber 27 and from there through a conduit to the top of the treatment tank. The effluent from the bottom of the tank flows through a conduit into the chamber 37 of the manifold and thence up through body port 48 into the passage 68, and thence through central port 69 and passages 55 to drain 43. A predetermined amount of brine is withdrawn from the brine tank, until the fluid level reaches the brine valve suction port, whereupon a float valve of the brine tank automatically shuts off the valve. At this time the water flow through the ejector to the top of the treatment tank continues, for the slow rinse of the material in the tank. The adjustment of ejector nozzle 47 determines the flow rate during the slow rinse step. A portion of the untreated water is bypassed to service through port 64, body port 36, manifold chamber 33 and the service line.

Finally, in the "fast rinse" position of the plate, the port 64 registers with the small bore body port 56, restricting the flow into manifold chamber 27. The passage 68 registers with the body port 40. The port 65 registers with the body ports 41 and 48. Port 63 connects with body port 44, and chamber 33, to the service line, supplying raw water to the service line in diminished volume.

In this position, raw water from the inlet passes down through port 64 and body port 56 into the chamber 27 and from there through a conduit to the top of the treatment tank. At the same time, raw water also passes down through port 63 and body port 44 into the chamber 33. A portion of the water from chamber 27 enters the venturi 48, thence to the brine tank, which refills the brine tank until the float cuts it off by closing the brine valve. The effluent from the bottom of the treatment tank flows through inlet 38 to the chamber 37 and from there up through body port 40 into the passage 68 and thence through the central port 69 and passages 55 to drain 43.

Finally, in the next rotation, the plate is returned to the service position, and the cycle of rotation is complete.

The turbine means, as shown in the embodiments of the drawings, are in the form of vanes or blades, made of metallic material and attached to the periphery of the metal plate by brazing, soldering or welding. As will be apparent to one skilled in this art, the turbine means can be made of any material, the selection of material being dependent on the resistance to pressure and corrosion by the fluid being valved. The plate and turbine can also be molded from synthetic plastic material, such as polyethylene, polypropylene, polyoxymethylene, nylon, polyvinyl chloride, polyester resins, polytetrafluoroethylene, polytrifluorochloroethylene, polystyrene, urea-formaldehyde and phenol-formaldehyde resins.

The turbine means can have any shape or configuration adapted to offer resistance to a stream of fluid directed thereon, so that the pressure of the fluid will turn the rotor. The turbine may be at any position on the surface of the plate, not only at the side, as shown in the drawing but also on the top, either at the side, or in the center, or extending all the way across the top or surface.

The turbine rotary plate of the invention is useful in multiport valves of all types, whether operated manually or automatically by aid of a pressure-responsive diaphragm or by an electric motor. For example, the multiport valves shown in the drawing are all of the lift turn type, that is the rotary plate is adapted to be raised for rotation and then lowered to return it to its operating position. As will be apparent to those skilled in this art, the plate can be rotatable, but fixed in the confronting position with respect to the ported body of the valve, and the track arranged to be lifted either manually or automatically, by action of a pressure-responsive diaphragm, as shown, or by an electric motor, when the plate is to be turned to the next operating position of the valve. In such a circumstance the recessed track and stop members of FIGURES 1 to 7 can be inverted, so that when the rack is lowered the key 19 of the plate is held against rotation in one of the recesses. Upon lifting the track, the key is released, and the rotary plate turns until the key 19 encounters the next stop member 22, at which point rotation is stopped, just as in the embodiments shown. Thereupon, when the track is lowered the key enters the next successive recess 21, and the plate is locked in that position for the next cycle of operation.

The multiport valves of the invention are useful in all kinds of fluid and particularly liquid systems. The embodiments shown are adapted for use in ion exchange or water softening apparatus where four positions of the valve are required, as described above. The number of positions of the plate and corresponding operative positions of the valve can of course be adjusted to meet the requirements. The valve is useful in household and industrial clothes washers and dishwashing machines, chemical plants, the petroleum industry, and the like. The system is especially advantageous in such use because of its ability to operate at low liquid pressure, and with a minimum of waste of the liquid being processed.

The embodiments of the invention in which an exclusive property or privilege is claimed are defined as follows:

1. A multiport lift turn valve comprising a body having a ported face, and flow passages communicating with the ports in said face; means defining a fluid supply chamber at one side of said ported face; a rotary port plate in said supply chamber, mounted to be seated in confronting relation with said ported face and to be unseated away from said ported face, turned and reseated at different rotative settings in confronting relation with said ported face, said plate having ports therein arranged to register with different ports in said ported face to pass fluid from said supply chamber through the ported face in different rotative settings of the plate; movable pressure responsive means exposed on one side to the fluid pressure from the supply chamber and operatively connected to the plate for unseating and reseating the plate; a plurality of turbine means, operatively connected to the surface of said plate for turning the latter between successive positions of the plate upon movement of the plate from its seated to an unseated position; a fluid inlet for passing fluid into the supply chamber and against the turbine means to effect rotation of said plate; a track providing a guide edge positioned at the periphery of the plate, in a plane substantially parallel to the plane of rotation of the plate; a key attached to the plate and traveling along the track; a plurality of key-receiving recesses in the track, each recess disposed at an angle to the plane of rotation of the plate, and in positions corresponding to registering positions of the plate, and a plurality of key stop members at such recesses, to stop and retain the plate in registering positions in a recess between successive unseated positions of the plate.

2. A multiport lift turn valve in accordance with claim 1 including means defining a pressure chamber at the opposite side of the movable pressure responsive means; means communicating with said fluid inlet for receiving fluid therefrom to establish fluid pressure at the opposite side of the pressure responsive means equalling the fluid pressure at said inlet; means for emptying fluid from said pressure chamber to lower the pressure at said opposite side of the pressure responsive means below the pressure on one side thereof to effect movement of the pressure responsive means for unseating the plate.

3. A multiport lift turn valve in accordance with claim 1 including means defining a flow restriction at said fluid inlet to effect a forceful ejection of fluid directed against said turbine means.

4. A multiport lift turn valve in accordance with claim 1 in which the movable pressure responsive means is a flexible diaphragm extending across the supply chamber.

5. A multiport lift turn valve in accordance with claim 1 wherein the rotary port plate has a central ferrule member connecting the fluid supply chamber to drain at all positions of the plate.

References Cited by the Examiner
UNITED STATES PATENTS

| | | | |
|---|---|---|---|
| 978,256 | 12/1910 | Wright | 251—311 |
| 1,203,395 | 10/1916 | Palmer | 251—311 |
| 2,081,510 | 5/1937 | Smart | 137—624.14 |
| 2,518,001 | 8/1950 | Goddard | 137—624.14 X |
| 2,807,141 | 9/1957 | Strader | 137—624.14 X |
| 2,825,363 | 3/1958 | Bird | 137—625.46 X |
| 2,833,309 | 5/1958 | Bird | 137—625.46 |
| 2,968,311 | 1/1961 | Whitlock | 137—624.14 X |

ISADOR WEIL, *Primary Examiner.*

A. COHAN, *Assistant Examiner.*